United States Patent Office 2,770,821
Patented Nov. 20, 1956

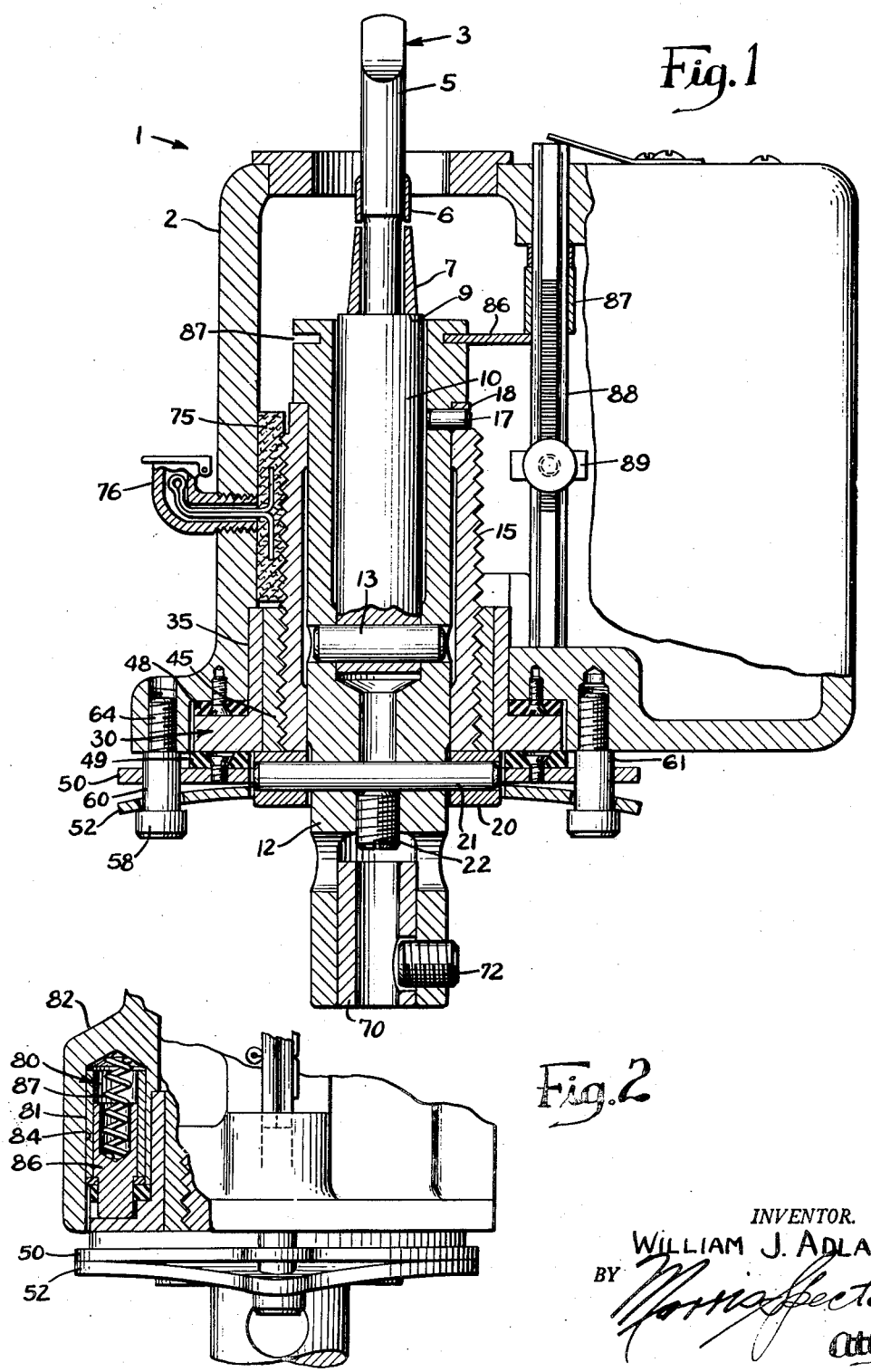

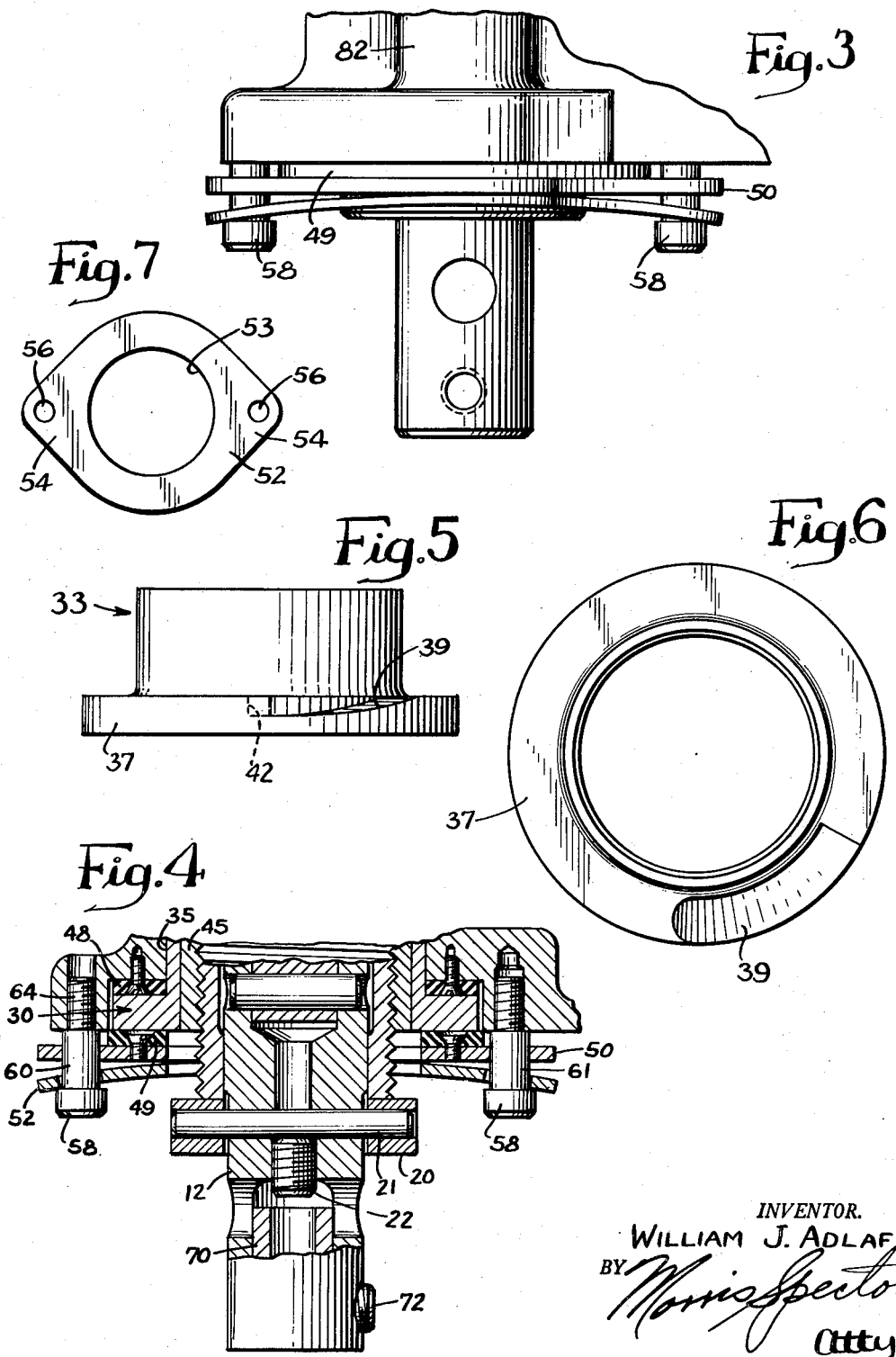

2,770,821
LEAD SCREW TAPPING ATTACHMENT HAVING TORQUE RESPONSIVE FEED NUT

William J. Adlaf, North Riverside, Ill., assignor to Boyar-Schultz Corporation, Chicago, Ill., a corporation of Illinois Application March 24, 1954, Serial No. 418,385

1 Claim. (Cl. 10—135)

This invention relates to tapping attachments adapted to be attached to drill presses or the like for converting an ordinary drill press into a precision tapping machine.

In the tapping of screw threads it is customary to rotate the tapping device and at the same time advance it to give the necessary pitch to the threads being cut. The tap is advanced an amount equal to the depth of the screw threads to be cut, whereupon the advancing movement of the tap is stopped. At the same time, the rotary movement of the tap should be stopped. In high precision tapping the stopping of the rotary motion of the tap must be at precisely the same time that the advancing movement is stopped. Inertia effects present no great difficulty in the stopping of the longitudinal or advancing movement of the tap, but do present a problem in the stopping of the rotary movement of the tap. This is due to the fact that the rotary motion is so much greater than the longitudinal motion that the kinetic energy of rotation of the parts is considerable. If the rotation of the tap is to be stopped instantly means must be provided to take up the kinetic energy of the rotating driving parts without imparting the rotation of those parts, under the kinetic energy of the tap. If such means is not provided there may be danger that the rotating parts will either cause breakage within the structure that holds the tap or will cause the tap to continue to rotate and strip the threads that it has cut in or on the work.

One of the difficulties in high precision screw tapping lies in the requirement that the tap shall continue precisely to the extent desired. In the case of a precision device, the amount of play within the device must necessarily be exceedingly small. When the motor or driving device is stopped there is a certain amount of inertia in the device which tends to continue the movement thereof. If the tap is to be stopped instantly means must be provided to take up the kinetic energy of the rotating parts that drive the tap. If such means is not provided, then there is the possibility that under some circumstances there may be danger that the moving parts may be sufficient either to break something within the tapping device or will cause the tap to strip threads that it has cut in the work.

It is one of the objects of the present invention to provide a releasable connection in the drive between the attachment and the tap, that releasable connection being clamped together by two friction members that are held in contact with a fixed and predetermined pressure, so that if the force tending to continue the retention of one of the parts when its advance has been stopped should exceed that predetermined amount, the releasable connection will permit slippage between the parts and thus avoid breakage. In accordance with the principles of the present invention the spring for applying the necessary tension to the two releasable parts is clamped in place in such a manner that the attendant merely tightens one or more screws or bolts until the bolt reaches a stop, whereupon the requisite spring pressure is obtained. By this arrangement the tension will always be of the required amount independent of the judgement of the operator in tightening the bolts.

The attainment of the above and further objects of the present invention will be apparent from the following specification taken in conjunction with the accompanying drawings forming a part thereof.

In the drawings:

Fig. 1 is a longitudinal sectional view through a lead screw tapping attachment embodying the present invention, some of the parts being shown in elevation;

Fig. 2 is a front elevational view of a portion of the attachment of Fig. 1, with parts thereof broken away to show the interior construction;

Fig. 3 is a side view of the lower portion of the attachment illustrated in Fig. 1;

Fig. 4 is a view of a portion of Fig. 1 with the driver assembly in a position lower than that illustrated in Fig. 1;

Fig. 5 is a front view of the lead nut sleeve of Fig. 1;

Fig. 6 is a plan view of the lead nut sleeve; and

Fig. 7 is a plan view of the friction disc spring of the attachment of Fig. 1.

Reference may now be had more particularly to the drawings wherein like reference numerals designates like parts throughout.

The lead screw tapping attachment of the present invention, indicated in general by the reference numeral 1, is contained within a housing 2 that is adapted to be attached to the supporting column of a conventional drill press by a bracket that permits the swinging of the attachment from an inoperative position where it is out of the way of the drill press, leaving the drill press available for ordinary drilling operation, to an operative position wherein a driver assembly 3 of the attachment is in line with the axis of rotation of the drill spindle and adapted to be rotated thereby. To that effect, a conventional split clamp may be used that may be tightened on the supporting column of the drill press to hold the device in position and by loosening of the clamp the device may be swung around the supporting column of the drill press into an inoperative position. The driver assembly 3 includes a Morse driver 5, a Morse sleeve locking driver 6, and a Morse sleeve retainer 7. The retainer 7 at its lower end rests on a shoulder 9 of the Morse driver, which Morse driver terminates in a cylindrical portion 10. A spindle 12 that has a cylindrical bore at its upper end is slipped over the cylindrical portion 10 and secured in place by a dowel pin 13. A lead screw 15 is mounted on the spindle 12 by a lead screw drive pin 17, the lead screw having a notch 18 at its upper end into which the drive pin fits fairly snugly. The lead screw 15 is held in its upper position by a lead screw retainer ring 20 that is secured to the spindle by a dowel pin 21. A hollow head set screw 22 threads into the spindle at right angles to the dowel pin 21 for holding the dowel pin 21 in place.

The driver assembly 3 is supported within the housing 2 by a lead screw nut assembly 30 which includes a lead nut sleeve 33 (Figs. 5 and 6) having an accurately ground cylindrical sleeve surface that makes a very sliding and turning fit within an accurately formed cylindrical bore 35 in the housing 2. The sleeve 33 terminates at its lower end in a peripheral flange 37 the lower surface of which is flat and the upper surface of which is also flat except for an arcuate cut-away ratchet surface 39 that merges smoothly at its upper end with the top surface of the flange 37 and at its lower end terminates in an arcuate vertical shoulder 42. A lead nut bushing 45 is fitted into the lead nut sleeve 33 so as, in effect, to be non-rotatable with respect thereto and, in operation of the device, to all intents and purposes integral with the lead nut sleeve.

The sleeve 33 is of cast iron and the bushing 45 is of bronze. The tight fit between the two is obtained by heating the cast iron sleeve to about 1550° F. and then shrinking the same over the bronze lead nut bushing.

The lead screw nut assembly is held in place between an upper friction disc 48 that is secured to the housing 2, and a lower friction disc 49 that is secured to a retainer ring 50. The friction discs are made of suitable slightly compressible material. The retainer ring 50 is held in place by a friction disc spring 52. The spring 52 is of spring steel that is heat treated and hardened. The friction disc spring 52 is of the shape shown in plan view in Fig. 7, in end view in Figs. 2 and 3, and in longitudinal section in Figs. 1 and 4. The friction disc spring 52 has a central oversized opening 53 and a pair of ears 54—54 each of which has a hole 56 for receiving a shoulder screw 58 for mounting the retainer ring 50 in place. The head of each screw 58 bears against the bottom of the friction disc spring 52 and the shank 60 thereof extends loosely through the hole 56 and through a corresponding oversized hole in the retainer ring 50. The threaded stem 64 of each screw 58 is threaded into the housing 2 until a shoulder 61 at the top of the cylindrical portion of the shank 60 bears against the bottom of the housing 2. The shank 60 is of a size calculated in relation to the spring 52 such that when the shoulder 61 of the shank bears against the bottom of the housing 2 the head of the screw will have flexed the friction disc spring 52 with a pre-ascertained amount of force, so that the friction disc 52 exerts a predetermined amount of force against the retainer ring 50, so that the pressure at the upper and lower friction rings 48 and 49 against the upper and lower surfaces of the flange 30 is of a predetermined value. By this arangement the operator, in assembling the device, is not called upon to exercise judgment as to the amount of pressure that is to be exerted by the friction discs for holding the flange 37 of the lead screw nut assembly 30 against rotation.

At its lower end the spindle 12 has an adapter bushing 70 held in place by a hollow head set screw 72 that threads into the spindle and is adapted to bear against a tap inserted into the bushing 70 for firmly securing the tap to the spindle 12. The adapter bushing 70 may be replaced as required for taps of different sizes.

Oil means is provided for furnishing lubrication between the lead screw 15 and the lead nut assembly. This comprises a conventional felt oiler 75 that is supplied with oil from an oiling cup 76.

The lead screw nut asembly 30 is normally held against rotation by the friction rings 48—49. When the force tending to rotate it exceeds the holding effect of the friction rings, the lead screw nut assembly may turn an unlimited amount in one direction and a limited amount in the other direction. The means for limiting the turning in one direction comprises a ratchet pin assembly 80, shown more particularly in Fig. 2. The ratchet pin assembly is mounted in a bore 81 in a bulged portion 82 at the bottom of the housing 2. The assembly comprises a tubular ratchet pin bushing 84 in which a lead nut ratchet pin 86 is slidable lengthwise against the action of a compression spring 87. The lower end of the lead nut ratchet pin extends through and is slidable in a hole in the upper friction disc and bears against the top surface of the flange 37 of the lead nut screw assembly. It is thus apparent that if an attempt is made to rotate the lead screw nut assembly in one direction the lead nut ratchet pin 86 will bear against the arcuate ratchet shoulder 42 of the flange 37 and prevent such rotation, whereas if a force is applied tending to rotate the lead nut sleeve 33 in the opposite direction the bottom of the lead nut ratchet pin 86 will rotate on the top of the flange 37 until it drops at the arcuate portion 42 and then rides along the ratchet surface 39, so that while there will be a click during each revolution of the lead screw nut assembly the ratchet pin will not prevent such rotation. The lead screw 15 and the lead screw nut assembly 30 of the universal tapper of the present invention may readily be removed and replaced by corresponding other parts, as required for tapping of different pitches and as required for right hand threads or left hand threads. All that is required for such replacement is a removal of the shoulder screws 58—58 which then permits removal of the retainer ring 50 and removal of the lead screw nut assembly 30. Different lead screw nut assemblies 30 may be provided each having the same outside diameter as the lead nut sleeve 33, and different ones having lead nut bushings of threads of different pitch some being right hand threads and some being left hand threads. In the cases of right hand threads and left hand threads the corresponding clutch surfaces 39 and 42 are reversed.

At its upper end the spindle 12 carries a bifurcated spindle plate 86 the fingers of which extend into a peripheral slot 87 in the spindle, so that the spindle may turn while the spindle finger plate 86 is held against rotation but moves vertically with the spindle. The spindle finger plate is adapted, in its upper position, to bear against a switch actuator 87 mounted on a vertically slidable operating rod 88. In its lower position the plate 86 engages an adjustably located operating rod collar 89 on the rod 88 to move the operating rod 88 in the opposite direction. The operating rod controls microswitches that control the automatic stopping of the motor that drives the drill press when the tap in the bushing 70 reaches its lowermost position as determined by the setting of the collar 89, or its uppermost position by engagement with the switch actuator 87.

In compliance with the requirement of the patent statutes I have here shown and described a preferred embodiment of my invention. It is, however, to be understood that the invention is not limited to the precise construction here shown, the same being merely illustrative of the principles of the invention. What I consider new and desire to secure by Letters Patent is:

A lead screw tapping attachment comprising a driver assembly, a lead screw connected to the driver assembly, means securing the two against relative rotation, a nut assembly into which the lead screw threads, said nut assembly having a peripheral flange, friction disks engaging opposite faces of the flange, one of said disks bearing against a stationary bearing surface, means for forcing the other friction disk toward the said one friction disk for frictionally holding the nut assembly against turning but permitting such turning when the turning torque applied thereto exceeds the holding force of the friction disks, said last-mentioned means including a friction disk spring forcing said other disk against said flange for maintaining pressure between the disks and the flange in an amount determined by the setting of the spring, a stationary housing, and means mounting the assembly of the driver assembly and the nut assembly in the housing, said mounting means including at least one shoulder screw having a head bearing against the friction disk spring and a shank threaded into the housing and a shoulder limiting the threading of the shoulder screw into the housing, the distance between the shoulder and the head of the screw being correlated to the spring tension to cause the spring to exert the required pressure between the friction disks and the flange when the screw is threaded to a position limited by the shoulder of the shoulder screw.

References Cited in the file of this patent

UNITED STATES PATENTS

| | | |
|---|---|---|
| 1,346,245 | Palosky | July 13, 1920 |
| 1,681,289 | Galloway | Aug. 21, 1928 |
| 2,345,910 | Fawcett | Apr. 4, 1944 |
| 2,391,438 | Muir | Dec. 25, 1945 |

FOREIGN PATENTS

| | | |
|---|---|---|
| 534,439 | Great Britain | Mar. 6, 1941 |